United States Patent
Mulvaney, III et al.

(10) Patent No.: US 6,432,369 B1
(45) Date of Patent: *Aug. 13, 2002

(54) APPARATUS FOR CONTROLLING REACTION TEMPERATURES

(75) Inventors: Robert C. Mulvaney, III, Arlington Heights; Kevin J. Brandner, Bartlett; Steven T. Arakawa, Hoffman Estates; Paul Anderson, Palatine, all of IL (US)

(73) Assignee: UOP LLC, Des Plaines, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,072

(22) Filed: May 19, 1999

Related U.S. Application Data

(62) Division of application No. 08/971,631, filed on Nov. 17, 1997, now Pat. No. 5,948,240.

(51) Int. Cl.[7] ............................... B01J 8/08; F28D 7/00
(52) U.S. Cl. .................... 422/213; 422/200; 422/216; 422/282
(58) Field of Search ................................. 422/213, 216, 422/219, 200, 190, 232, 233, 191, 139, 145, 196, 197

(56) References Cited

U.S. PATENT DOCUMENTS

| | | | | |
|---|---|---|---|---|
| 3,512,639 A | * | 5/1970 | Kugelman et al. | |
| 3,652,231 A | | 3/1972 | Greenwood et al. | ...... 23/288 G |
| 3,751,228 A | * | 8/1973 | Semenov | .................... 422/191 |
| 5,525,311 A | * | 6/1996 | Girod et al. | ................. 422/200 |
| 5,540,899 A | * | 7/1996 | Koves | ......................... 422/200 |

* cited by examiner

*Primary Examiner*—Jerry D. Johnson
*Assistant Examiner*—Alexa A. Doroshenk
(74) *Attorney, Agent, or Firm*—John G. Tolomei; John C. Paschall

(57) ABSTRACT

An apparatus for contacting reactants with a particulate catalyst while indirectly contacting the reactants with a heat exchange medium amid simultaneous exchange of catalyst particles by an operation that sequentially restricts reactant flow while moving catalyst through reaction stacks in which the reactant flow has been restricted. The apparatus permits a change out of catalyst in a channel type reactor arrangement that would normally restrict catalyst flow during operation. Moving catalyst through a heat exchange type reactor having reactant and heat exchange channels permits control of catalyst activity as well as temperatures.

11 Claims, 5 Drawing Sheets

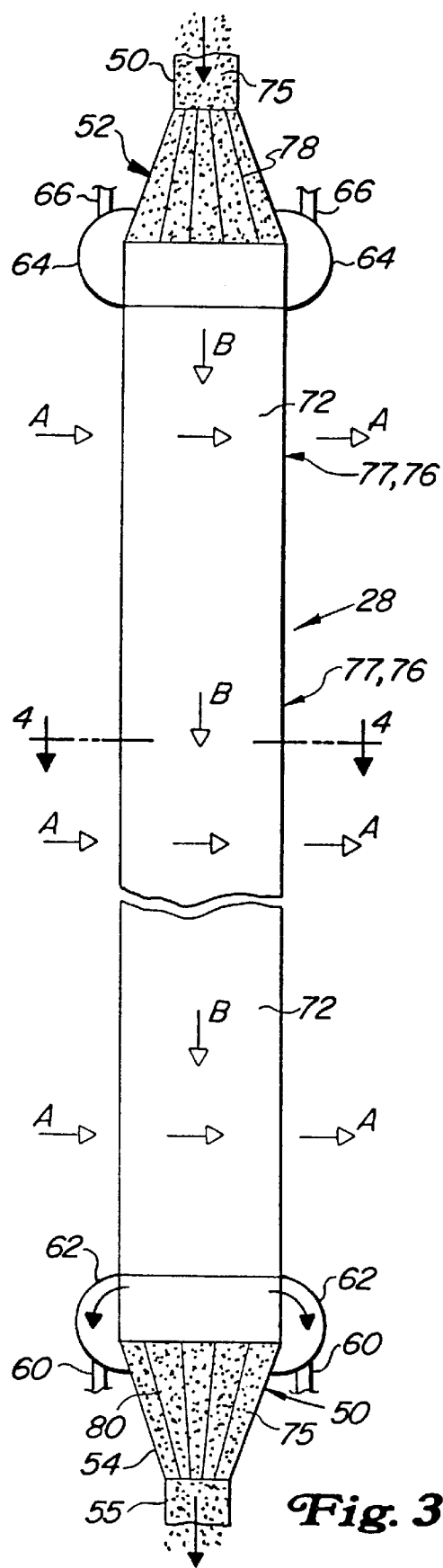
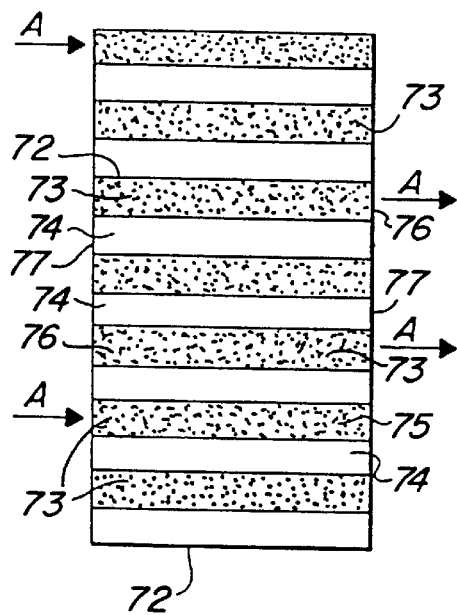
Fig. 3
Fig. 4

APPARATUS FOR CONTROLLING REACTION TEMPERATURES

CROSS-REFERENCE TO RELATED APPLICATION

This application is a divisional application of Ser. No. 08/971,631 filed Nov. 17, 1997, now U.S. Pat. No. 5,948,240.

FIELD OF THE INVENTION

This invention relates to chemical reactors for the conversion of a reaction fluid while replacing catalyst and indirectly exchanging heat with a heat exchange fluid.

BACKGROUND OF THE INVENTION

In many industries, like the petrochemical and chemical industries for instance, the processes employ reactors in which chemical reactions are effected in the components of one or more reaction fluids in contact with a catalyst under given temperature and pressure conditions. Most of these reactions generate or absorb heat to various extents and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone.

One solution to the problem has been the indirect heating of reactants and/or catalysts within a reaction zone with a heating or cooling medium. The most well known catalytic reactors of this type are tubular arrangements that have fixed or moving catalyst beds. The geometry of tubular reactors poses layout constraints that require large reactors or limit throughput.

Indirect heat exchange has also been accomplished using thin plates to define alternate channels that retain catalyst and reactants in one set of channels and a heat transfer fluid in alternate channels for indirectly heating or cooling the reactants and catalysts. Heat exchange plates in these indirect heat exchange reactors can be flat or curved and may have surface variations such as corrugations to increase heat transfer between the heat transfer fluids and the reactants and catalysts. Although the thin heat transfer plates can, to some extent, compensate for the changes in temperature induced by the heat of reaction, not all indirect heat transfer arrangements are able to offer the complete temperature control that would benefit many processes by maintaining a desired temperature profile through a reaction zone. Many hydrocarbon conversion processes will operate more advantageously by maintaining a temperature profile that differs from that created by the heat of reaction. In many reactions, the most beneficial temperature profile will be obtained by substantially isothermal conditions. In some cases, a temperature profile directionally opposite to the temperature changes associated with the heat of reaction will provide the most beneficial conditions. An example of such a case is in dehydrogenation reactions wherein the selectivity and conversion of the endothermic process is improved by having a rising temperature profile or reverse temperature gradient through the reaction zone. A specific arrangement for heat transfer and reactant channels that offers more complete control can be found in U.S. Pat. No. 5,525,311; the contents of which are hereby incorporated by reference.

Most catalysts for the reaction of hydrocarbons are susceptible to deactivation over time. Deactivation will typically occur because of an accumulation of deposits that cause deactivation by blocking active pore sites or catalytic sites on the catalyst surface. Where the accumulation of coke deposits causes the deactivation, reconditioning the catalyst to remove coke deposits restores the activity of the catalyst. Coke is normally removed from the catalyst by contact of the coke-containing catalyst at high temperature with an oxygen-containing gas to combust or remove the coke in a regeneration process. The regeneration process can be carried out in situ or the catalyst may be removed from a vessel in which the hydrocarbon conversion takes place and transported to a separate regeneration zone for coke removal. Arrangements for continuously or semi-continuously removing catalyst particles from a bed in a reaction zone for coke removal in a regeneration zone are well known. U.S. Pat. No. 3,652,231 describes a continuous catalyst regeneration process which is used in conjunction with catalytic reforming of hydrocarbons; the teachings of which are hereby incorporated by reference. In the case of the reaction zone, the catalyst is transferred under gravity flow by removing catalyst from the bottom of the reaction zone and adding catalyst to the top.

A phenomenon known as "pinning" inhibits catalyst transfer in many reactor arrangements. "Pinning" is the phenomenon wherein the flow of reactant gas at sufficient velocity can block the downward movement of catalyst. "Pinning" is a function of the gas velocity and the physical characteristics of the flow channel in which the flowing gaseous reactants contact the catalyst. As the gas flows through the channels that retain the catalyst, the gas impacts the catalyst particles and raises intergranular friction between the particles. When the vertical component of the frictional forces between the particles overcomes the force of gravity on the particles the particles become pinned. As the flow path length of gas through the catalyst particles becomes longer, the forces on the particles progressively increase from the outlet to the inlet of the flow channel. In addition, as the catalyst flow channel becomes more confined, the gravity flow of catalyst particles becomes more hindered. Accordingly, as the size of the flow channel becomes more confined, wall effects increasingly add to the vertical hold-up force on the catalyst particles. As a result narrow flow channels have a greater susceptibility to pinning and cannot normally provide continuous catalyst circulation.

In the case of reactors providing indirect heat exchange, the arrangement of the reactor exacerbates the problem of catalyst pinning. Increasing the number of channels by decreasing their size facilitates heat transfer by increasing the surface area between the heat exchange fluid and the catalyst. In addition, heat transfer is further facilitated by irregularities in the plate surface that create turbulence and reduce film factors that interfere with heat exchange. However, irregularities in the plates that define the channels further interfere with the movement of catalyst and promote a greater tendency for the catalyst to "pin." Therefore, methods and reactor arrangements are sought to use a channel type reactor that facilitates heat exchange and catalyst circulation while the reactor continues operation.

Accordingly, it is an object of this invention to provide a process for the contact of reactants with a bed of catalyst while providing indirect heat exchange with a heat exchange fluid and on stream circulation of the catalyst.

It is a further object of this invention to provide a reactor apparatus for the indirect heat exchange of a reactant stream and contact of the reactant stream with a bed of catalyst while allowing on stream circulation of the catalyst.

BRIEF SUMMARY OF THE INVENTION

This invention uses a sequential gas flow reduction or cessation, to periodically remove catalyst from selected reactant channels in a single reaction zone so that continuous circulation can be effected in the reaction zone while maintaining passage of reactants through the catalyst and while indirectly exchanging heat between reactants and a heat exchange medium. Subdivision of the reaction zone into a multiplicity of reaction stacks provides multiple reactant channel banks for selective flow reduction or cessation during catalyst transfer. The reaction stacks define alternating channel passageways. The channel passageways extend vertically and horizontally. Catalyst enters the reactant passageways and is continuously or semi-continuously removed from the bottom of the passageway to effect catalyst circulation. The reactants flow radially through the reactant passageways for contact with the catalyst. Plates defining the passageways provide a heat transfer surface for a heat transfer fluid that passes through the heat transfer channels. The withdrawal and/or addition of reactants to the reaction stacks is selectively controlled so that the flow of reactants to one or more reaction stacks is interrupted or restricted while the flow of reactants continues in the remaining reaction stacks. Restriction or interruption of the flow permits the catalyst to drop under gravity flow from the selected reactions zones.

The sequencing of reactant flow restriction and the withdrawal of catalyst may be accomplished in any manner that suits the particular process. The cycling of reactant flow reduction and the removal of catalyst particles may proceed continuously with sequential catalyst withdrawal from each reaction stack on a regular interval. Alternately, the process operation may continue until a predetermined degree of deactivation results. At such time, a sequencing of reactant flow restriction may be used to establish a cycle that replaces catalyst sequentially in each reaction zone until a desired degree of activity is again reestablished.

A combination of catalyst replacement and indirect heat exchange with a heat transfer fluid can also provide a reaction advantage for processes that use this invention. This combination can provide an isokinetic reaction condition within the reaction stacks. As catalyst is incrementally replaced in the reaction stacks, the most deactivated catalyst is removed from the bottom while the most active catalyst enters the top of the reaction stack. This periodic replacement thereby provides a continuous activity gradient down the length of the catalyst bed in each reaction stack. The decrease in activity can be compensated for by an increase in the reaction temperature. In the case of an endothermic reaction where a heating fluid enters the heat transfer channels, the fluid can enter the reaction stack in a flow direction that compensates for the loss of activity in the catalyst. By passing the heat exchange fluid from the bottom of the reaction stack to the top of the reaction stack, higher temperatures are maintained in the lower portion where the more deactivated catalyst contacts reactants. Progressing upwardly through the reaction stack, heating of the reactants cools the heating medium thereby resulting in a relatively reduced temperature for the reactants in the upper portion of the reaction stack which contains the most active catalyst. Tailoring of catalyst replacement, heating medium temperature, and heat exchange across the reactant and heat exchange channels can be arranged to provide an isokinetic operation across the reaction zone. This isokinetic operation can result in a more uniform product effluent and the most efficient utilization of the reaction volume in each reaction stack. Isokinetic conditions can be maintained with exothermic reactions as well as with endothermic reactions. In exothermic reactions, the cooling medium should enter the top of the heat exchange channels to maintain a co-current flow with the catalyst so that the maximum cooling is provided at the region of the most active catalyst.

Accordingly, in one embodiment, this invention is a process for contacting reactants with catalyst in a channel reactor and indirectly contacting the reactants with a heat transfer fluid that permits intermittent movement of catalyst through a catalyst bed. In the process catalyst particles are retained in a plurality of reactions stacks. Each reaction stack has a plurality of vertically and horizontally extended reaction channels and heat exchange channels. A reactant stream passes to at least one of the reactant stacks and contacts the catalyst with the reactant stream. A product stream is recovered from the reactant channels. A heat exchange fluid passes through the heat exchange channels, and an at least partial restriction of the flow of the reactant stream to a selected reaction stack is intermittently effected to transfer catalyst particles in the selected reaction stack by withdrawing catalyst particles from the bottom and adding catalyst particles to the top of the reaction stack. The flow of the reactant stream is reestablished to the reactant stack after the addition of catalyst thereto.

In another embodiment, this invention is a channel reactor arrangement for contacting reactants with a particulate catalyst, indirectly heat exchanging the reactants with a heat transfer fluid, and replacing catalyst particles on stream. The arrangement includes a plurality of reaction stacks made up of parallel plates that extend vertically and horizontally to define heat transfer channels and reactant channels in each reactant stack. Means are provided for passing a reactant stream through the reactant channels and selectively restricting the flow of the reactant stream through selected reactant channels. Means are also provided for passing and adding catalyst particles to the top and withdrawing catalyst particles from the bottom of each reaction stack. The reactant channels also work in cooperation with means for passing a heat exchange fluid through the heat exchange channels of each reaction stack.

In another embodiment, this invention is a reactor for contacting reactants with a particulate catalyst while indirectly heat exchanging the reactants with a heat exchange fluid and replacing catalyst particles on stream. The apparatus contains a reactor vessel that houses a plurality of reaction stacks. Each reaction stack comprises a plurality of parallel plates that extend vertically and horizontally to define heat transfer channels and reactant channels in each reaction stack. The reactor vessel defines a reactant inlet for passing a reactant stream into the reactant channels. At least two manifolds receive fluid from the reactant channels. Each manifold is in communication with a valve for regulating the flow of fluid from the reactant channels and each manifold communicates with less than the total number of reactant channels. A catalyst distributor at the top of each reactant stack and a catalyst collector at the bottom of each reactant stack operates in conjunction with means for selectively controlling the addition and withdrawal of catalyst particles to and from each reactant stack. Means are also provided for passing a heat exchange fluid through the heat exchange channels in each reaction stack.

Additional embodiments, arrangements, and details of this invention are disclosed in the following detailed description of the invention.

BRIEF DESCRIPTION OF THE DRAWINGS

FIG. 3 is a schematic representation of a reaction stack and the flow of catalyst, reactants, and heat exchange medium therethrough.

FIG. 4 is cross-section of the reaction stack taken along line 4—4 of FIG. 3.

DETAILED DESCRIPTION OF THE INVENTION

The process may be useful in a wide variety of catalytic reactions that use heterogeneous catalysts. Suitable reaction zone arrangements will employ a moving bed of catalyst as opposed to a fluidized bed of catalyst.

This invention is most beneficially applied to catalytic conversion processes having high heats of reaction. Typical reactions of this type are hydrocarbon conversion reactions that include: the aromatization of hydrocarbons, the reforming of hydrocarbons, the dehydrogenation of hydrocarbons, and the alkylation of hydrocarbons. Specific hydrocarbon conversion processes to which this invention are suited include: catalytic dehydrogenation of paraffins, reforming of naphtha feed streams, aromatization of light hydrocarbons and the alkylation of aromatic hydrocarbons.

The reaction zones for the process of this invention may indirectly contact the reactants with the heat exchange fluid in any relative direction. Thus, the flow channels and inlets and outlets of the reaction zones may be designed for cocurrent, countercurrent, or cross-flow of reactant and heat exchange fluid. Preferred process arrangements for practicing this invention will pass reactants in cross-flow to the heat exchange fluid. Cross-flow of reactants is generally preferred to minimize the pressure drop associated with the flow of reactants through the reactor. For this reason, a cross-flow arrangement can be used to provide the reactants with a shorter flow path across the reaction zone.

The shorter flow path reduces overall pressure drop of the reactants as they pass through catalyst particles retained in the reactor. Lower pressure drops can have a two-fold advantage in the processing of many reactant streams. Increased flow resistance i.e., pressure drop, can raise the overall operating pressure of a process. In many cases, product yield or selectivity is favored by lower operating pressure so that minimizing pressure drop will also provide a greater yield of desired products. In addition, higher pressure drop raises the overall utility and cost of operating a process.

It is also not necessary to the practice of this invention that each reactant channel be alternated with a heat exchange channel. Possible configurations of the reaction section may place two or more heat exchange channels between each reactant channel to reduce the pressure drop on the heat exchange medium side. When used for this purpose, a plate separating adjacent heat exchange channels may contain perforations.

Figure 1:
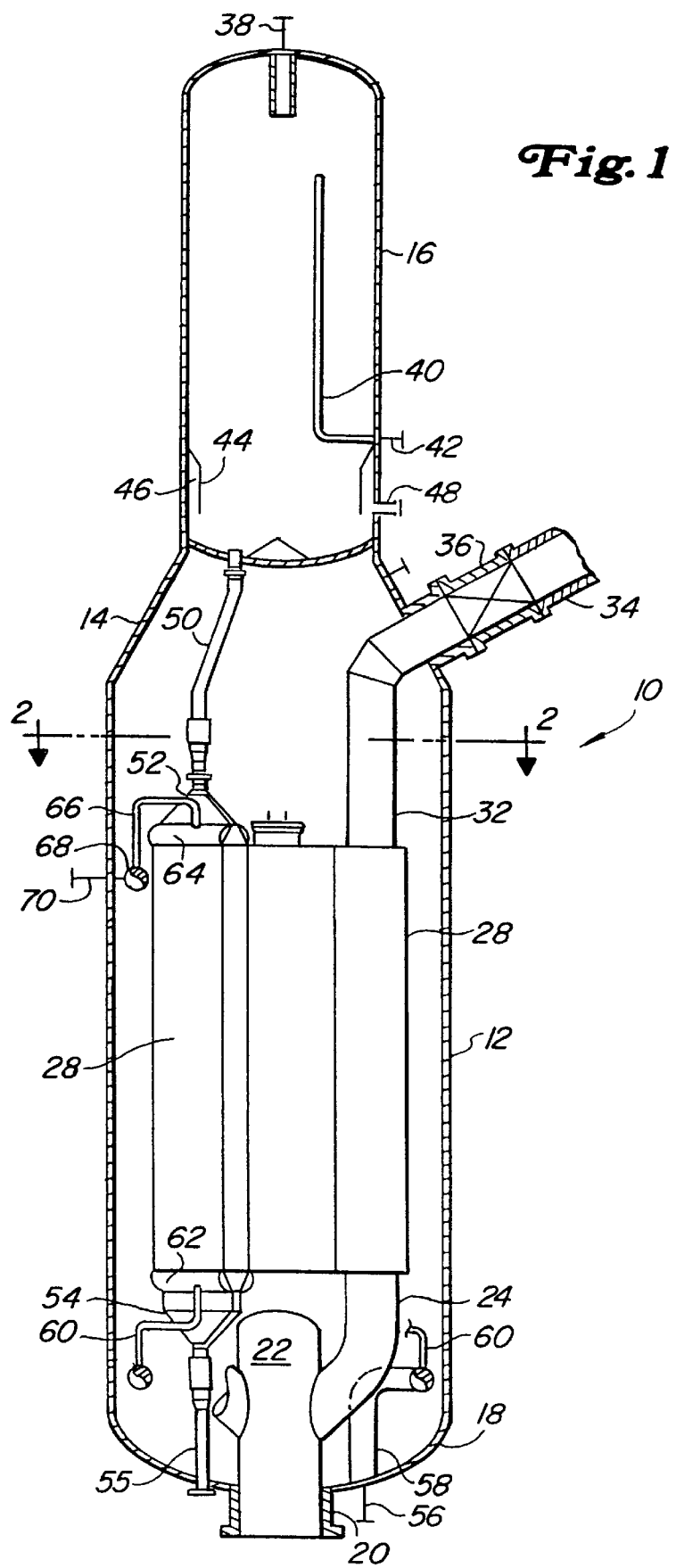
FIG. 1 is a sectional elevation of a reactor arranged in accordance with this invention.

The type and details of the reactor arrangement contemplated in the practice of this invention are best appreciated by a reference to the drawings. FIG. 1 is a schematic representation of a catalytic reactor section 10 designed to effect a catalytic reaction on a reactant fluid while using indirect heat exchange with a heat transfer fluid to maintain favorable reaction temperatures as the reactant fluid flows through the reaction section. The reactor section contains means for sequentially restricting flow out of portions of the reactor section to permit replacement of the catalyst in the reactor section. The reactor contains multiple reaction stacks. The reactor effects catalytic reaction of a horizontally flowing reactant fluid under controlled temperature conditions by indirect contact with a vertically flowing heat transfer fluid while permitting movement of catalyst through the reaction stacks.

Figure 2:
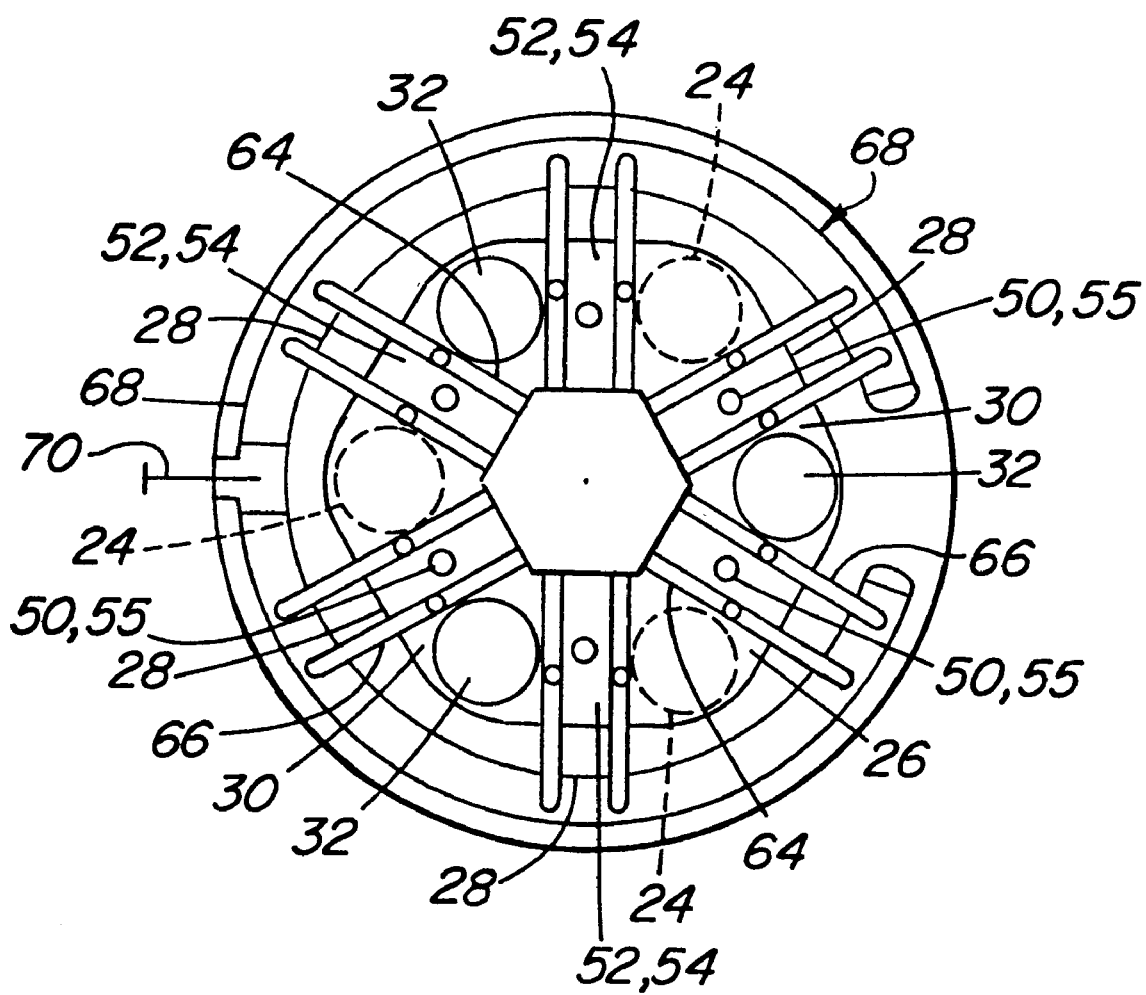
FIG. 2 is a section taken along line 2—2 of FIG. 1.

The reactor section 10 comprises a reactor vessel 12 having a circular cross-section. The reactor vessel 12 has a frusto conical head 14 that supports a catalyst vessel 16. A hemispherical head 18 closes the bottom of reactor vessel 12 and defines an inlet 20 for a reactant stream. Reactants flow through inlet 20 into a manifold 22 that distributes the reactants into reactant inlet pipes 24. As shown in FIG. 2, reactant inlet pipes 24 feed the reactant stream into distribution spaces 26. Reactants flow horizontally across reaction stacks 28 through vertically extended reactant flow channels defined therein. A collection space 30 collects reaction products from the reactant channels. An outlet pipe 32 withdraws the reaction products from each collection space 30 and transports the reaction products out of the reactor vessel via a line 34 at a rate regulated by a control valve 36. In the arrangement of FIGS. 1 and 2, each reactant inlet pipe 24 supplies reactants to two reaction stacks 28 while each outlet pipe 32 withdraws reactant products from two reaction stacks 28. The offsetting of the reactant inlet pipes 24 to the outlet pipes 32 results in each outlet pipe 32 withdrawing reactants supplied by two different reactant inlet pipes 24. Therefore, when control valve 36 restricts or stops the flow out of an outlet pipe 32, the remaining flow from the reactant inlet pipes passes to remaining open outlet pipes 32. In this manner the inlet piping remains active throughout the time that catalyst is removed from a reaction stack.

The reactant stream contacts a particulate catalyst in each of the reaction stacks. The catalyst will be present as discrete particles usually in a size range of from 2 to 15 mm in diameter. The particles may have any shape, but they will typically comprise spheres or cylinders. Catalyst vessel 16 retains catalyst for passage into the reactant channels of the reaction stacks 28. Catalyst enters the top of the catalyst vessel 16 through a catalyst loading nozzle 38. An optional gas distributor pipe 40 may distribute a gas stream from a nozzle 42 into catalyst vessel 16. Gas added to catalyst vessel 16 may be either a reduction gas for further treatment of the catalyst or a purge gas for evacuation of undesirable gas streams that may enter the catalyst vessel 16 in the void space of the catalyst as it enters the vessel. A collector baffle 44 defines an annular space 46 from which purge or other gases are withdrawn from catalyst vessel 16 via a nozzle 48.

Catalyst flows out of catalyst vessel 16 through catalyst transfer pipes 50 into a diffuser 52 that distributes catalyst across the top of the reaction channels in each reaction stack. A catalyst collector 54 at the bottom of each reaction stack 28 withdraws catalyst through catalyst withdrawal nozzles 55 in a manner hereinafter described.

The heat exchange fluid enters the process through a nozzle 56 that supplies heat exchange fluid to an inlet header 58. Distribution pipes 60 supply heat exchange fluid to a heat exchange manifold 62 at the bottom of each reaction stack 28. The heat exchange fluid flows vertically up the heat exchange channels in each reaction stack into a collector manifold 64 at the top of each reaction stack 28. Collection pipes 66 feed the heat exchange fluid into a collection manifold 68 which withdraws heat exchange fluid from the catalyst vessel 16 by a nozzle 70.

The arrangement and operation of the reaction stacks is shown more clearly by a schematic representation in FIGS. 3 and 4. Each reaction stack 28 comprises a plurality of parallel plates 72 as shown in FIG. 4. Suitable plates for this invention will comprise any plates that allow a high heat transfer rate. Thin plates are preferred and usually have a thickness of from 1 to 2 mm. The plates are typically composed of ferrous or non-ferrous alloys such as stainless steel. Each plate 72 may be smooth, but preferably has corrugations that are inclined to the flow of reactants and heat exchange fluid. The plates may be formed into curves or other configurations, but flat plates are generally preferred for stacking purposes. The corrugated plates may be stacked directly next to each other with the space between corrugations defining alternate reactant flow channels 73 and heat exchange channels 74. Where plates 72 contain inclined corrugations, the plates may be stacked next to each other to define the heat exchange and reactant flow channels as the area between corrugations. Preferably the corrugation pattern will be reversed between adjacent plates so that a herring bone pattern on the faces of opposing corrugated plates will extend in opposite directions and the opposing plates faces may be placed in contact with each other to form the flow channels and provide structural support to the plate sections.

Catalyst particles 75 fill the reactant flow channels 73. The sides 76 of reactant flow channel 73 are closed to catalyst flow by a permeable closure that still permits the flow of reactants in the direction indicated by arrows "A." The sides 77 of heat exchange channels 74 have a fluid impermeable closure that holds the heat exchange fluid over the length of channel 74. The tops of the heat exchange channels are closed to prevent catalyst entry therein. As shown in the reaction stack of FIG. 3, the heat exchange fluid flows downwardly as indicated by arrows "B" such that the reaction stack defines a specific circulation system for flows "A" and "B" wherein the reactant stream "A" and the heat exchange fluid "B" flow in crosswise directions and through alternate channels formed by adjacent plates 72.

As previously mentioned, catalyst particles 75 flow into the top of reactant flow channel 73 through diffuser 52. Diffuser 52 may contain internal baffles or corrugations 78 for distributing catalyst evenly across the top of the reactant channels. Similarly, collector 54 at the bottom of reactant flow channel 73 collects the catalyst particle 75 and may contain baffles or corrugations 80. The baffles or corrugations in the diffuser and collector promote a uniform replacement of catalyst across the entire horizontal length of each reactant flow channel 73.

Each reaction stack includes in its upper part an inlet for receiving the heat exchange fluid into circulation system "B." The inlet may be a single opening. FIGS. 3 and 4 show the manifolds 64 and 62 for distributing and collecting heat exchange fluid from the bottom and the top, respectively of reaction stack 28. Manifolds 64 and 62 communicate with the heat exchange channels 74 through openings in the sides 77 that are located at the top and bottom on opposite sides of the reaction stack. The manifolds provide a distribution area on the sides of the reaction stack. In the distribution area covered by manifolds 64 and 62, the sides 76 of the reactant channels are closed to prevent the entry of the heat exchange fluid into the reactant channels.

Figure 5:
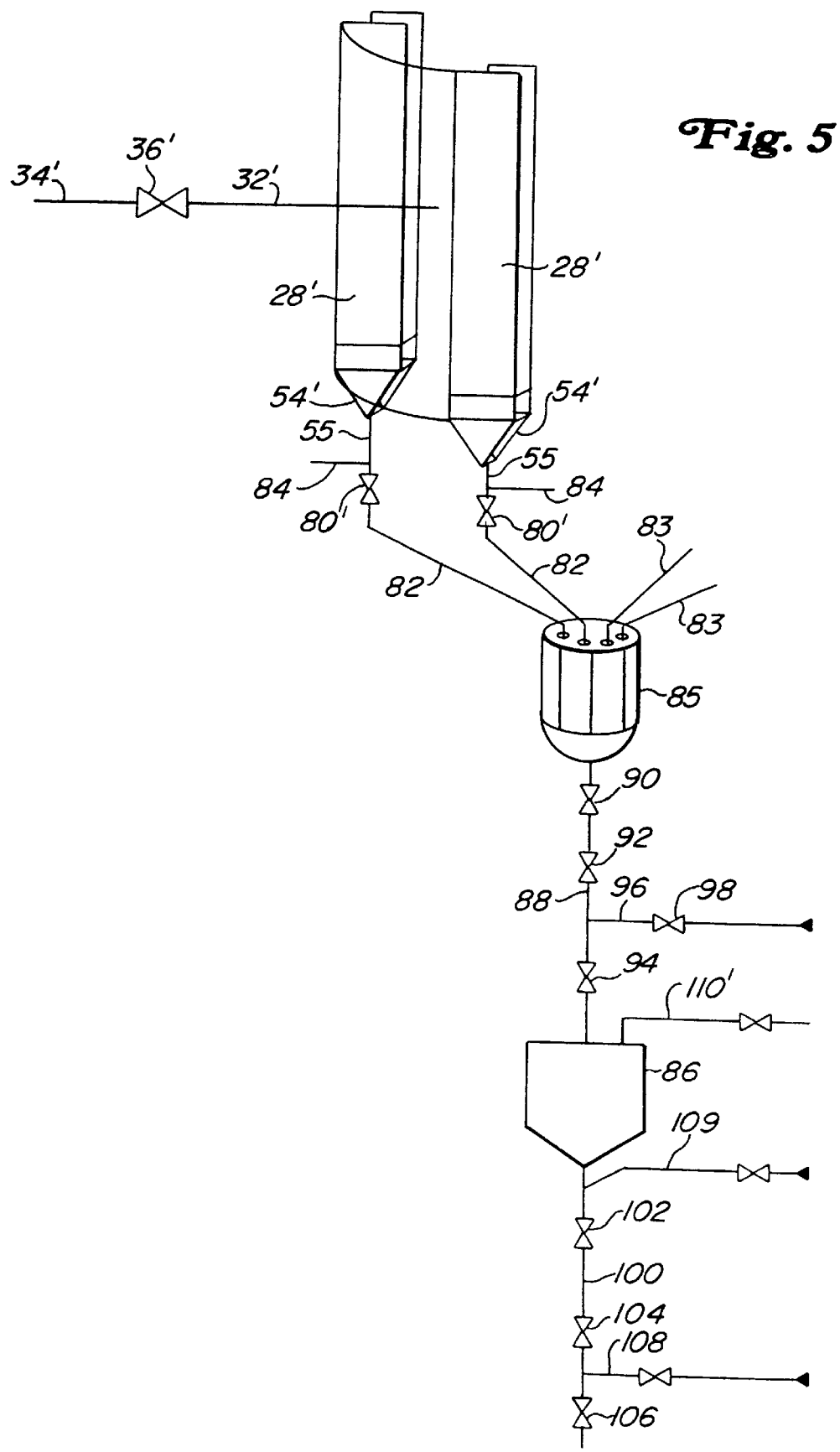
FIG. 5 is schematic diagram of a system for removing catalyst.

The system for removing catalyst from each of the reaction stacks is shown schematically in FIG. 5. As explained previously in the arrangement of FIGS. 1–4, each reactant pipe controls the withdrawal of products from an adjacent pair of reactant stacks. The control of reactant flow from reaction stacks 28' is shown schematically by valve 36' that regulates flow into an outlet line 34' from reactant product line 32'. Catalyst is withdrawn from the reaction stacks 28' by the opening of control valves 80' which deliver catalyst through lines 82 into a catalyst surge vessel 85. Surge vessel 85 is preferably compartmentalized into sections that each receive catalyst from one of the reaction stacks. The volume of each compartment in surge vessel 85 can be predetermined to correspond to the amount of catalyst withdrawn from each reaction stack during each withdrawal cycle. Catalyst collector 54' can serve as a holding zone for the volume of catalyst to be withdrawn in each withdrawal cycle. A continuous purge from line 84 can be added to evacuate reactants from the void volume of the catalyst while it is retained in collector 54'. Compartmentalizing the catalyst particles withdrawn from each reaction stack facilitates the monitoring of catalyst withdrawal to check whether each reaction stack is supplying catalyst during the withdrawal cycle. The filling of each compartment may be monitored by measuring the level in the compartment or by monitoring the temperature of the compartment to see if hot catalyst has entered. Lines 83 deliver catalyst to surge vessel 85 from other reaction stacks (not shown).

Catalyst passes from surge vessel 85 to a lock hopper 86. Catalyst passes into the lock hopper via a line 88. Line 88 contains a series of valves 90, 92, and 94. The combination of valves 90 and 92 provide a gas tight seal along line 88. Valve 90 occludes the line to catalyst flow and is designed to stop catalyst flow without damage to valve seals or seats, but it does not provide a gas tight seal. Once catalyst flow has been stopped, catalyst drops below the level of valve 92 which has gas tight seals, but is susceptible to damage if catalyst is present. Valve 94 also provides a gas tight seal and can isolate the lock hopper from the rest of line 88 for purposes of purging the remainder of line 88 into surge vessel 85 via nitrogen addition through a line 96 at a rate regulated by a control valve 98.

Catalyst passes out of lock hopper 86 through a line 100 that again contains a series of three valves: 102, 104, and 106. The valve series in line 100 operates in the same manner as the valves on line 88 with valve 102 providing a catalyst seal while valves 104 and 106 supply a gas seal once the catalyst is clear. A line 108 provides a nitrogen purge for isolating the lock hopper from the atmosphere below valve 106. The lock hopper may also receive a continuous inert purge from the line 109 to evacuate oxygen from the lock hopper during the unloading of catalyst. Purging gas and purged gases exit the lock hopper through a line 110'.

Lock hopper 86 is sized to store catalyst until its removal from the process for regeneration. Lock hopper 86 may store catalyst for transfer to a continuous catalyst regeneration system that operates in conjunction with the reactor or may retain catalyst for loading into drums and off site regeneration or replacement. Where catalyst from the lock hopper is unloaded into drums, the lock hopper will preferably have sufficient volume to hold the volume of catalyst contained in the reaction stacks. This permits one complete change out of catalyst from the reaction stacks before unloading of the lock hopper is necessary. As the lock hopper is unloaded, oxygen from the atmosphere will flow back into the lock hopper. The purge system provides means for removing this oxygen which, in most reaction systems, oxygen must be kept out of the reaction zones.

Figure 6:
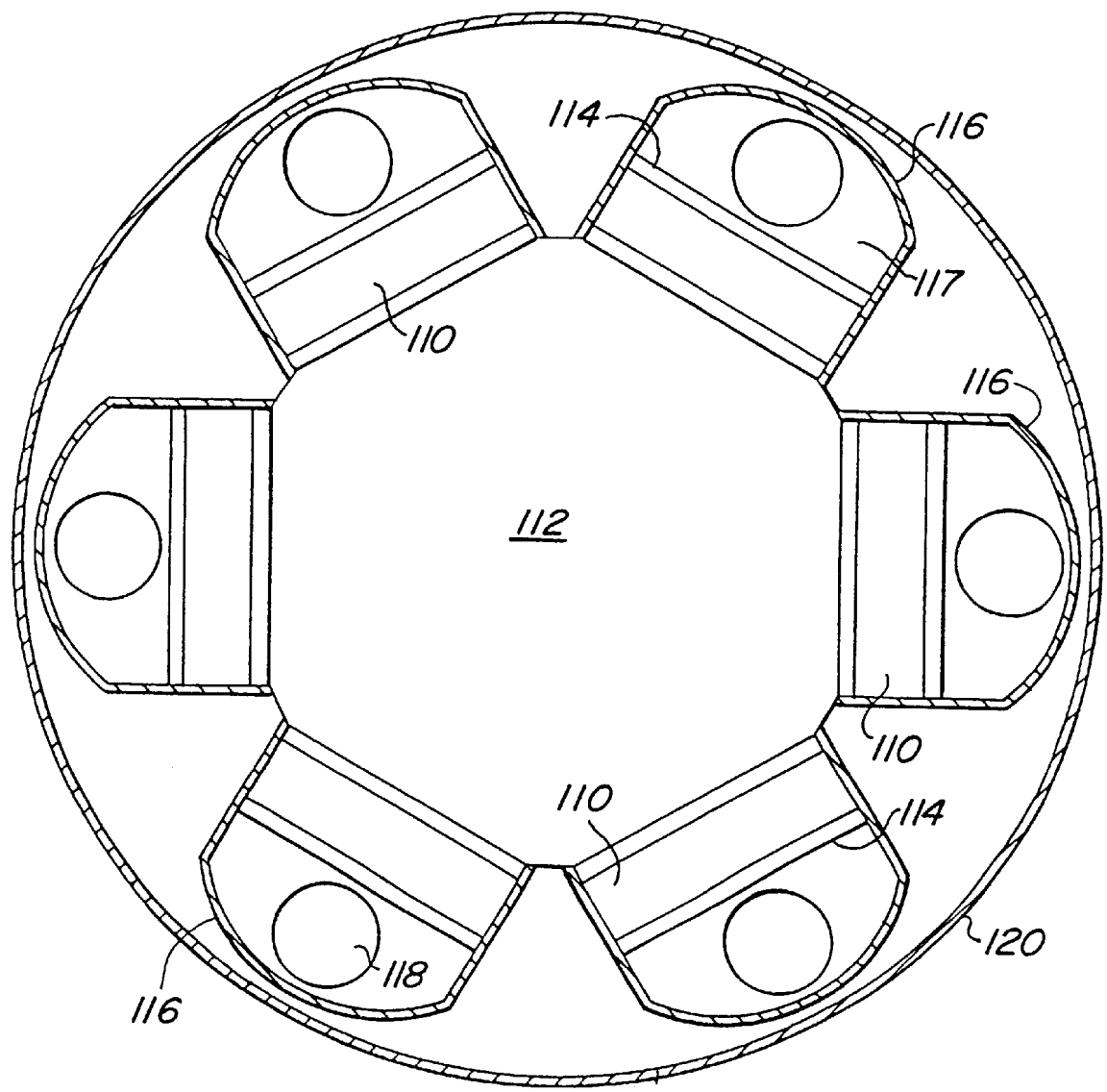
FIG. 6 shows a horizontal cross-section of a reactor containing reaction stacks similar to those shown in FIGS. 1–4.

The process may be operated in a variety of ways. The essential element for the unloading or loading of catalyst from the narrow channels formed by the reaction stacks is the restriction of flow into or out of the reaction stacks. Flow into the reaction stacks or out of the reaction stacks may be arranged to control multiple reaction stacks at one time as shown by the embodiment of the invention in FIGS. 1–5. Alternately, the flow of reactants into or products out of each reaction stack may be individually controlled. An arrangement for the individual flow of reactants into or out of each reaction stack is shown in FIG. 6. FIG. 6 shows a horizontal cross-section of a reactor containing reaction stacks similar to those shown in FIGS. 1–4. FIG. 6 differs from FIGS. 1–4 in that the reaction stacks 110 are arranged circumferentially in a polygonal arrangement around a central space 112 that can serve as a distributor or as a collector. A baffle 116 surrounds the outside 114 of each reaction stack 110. Baffle 116 again defines a space at the outside of each reaction stack 110 that can serve as a collector or distributor. Individual pipe openings 118 14communicate with the outer space 117 enclosed by each baffle 116. Appropriate valving on the piping to pipe openings 118 can selectively restrict or stop flow through each individual reaction stack. All of the reaction stacks may again be surrounded by a reaction vessel 120 to provide pressure containment for the reaction.

In one method of operation, the reaction section shown in FIGS. 1–5 will operate with only periodic catalyst replacement. During most of the operation, the catalyst will remain in the reaction stacks and the sequencing of reactant or product effluent flow will only occur during a transitory period while a cycle of catalyst replacement in the reaction stacks occurs. Therefore, reactants will enter the reactor vessel through manifold 22 and be withdrawn through outlet pipe 32 until a predetermined time period or degree of deactivation in the catalyst is observed.

Once catalyst placement is desired, a sequencing of catalyst withdrawal from the pairs of reaction stacks will begin. The sequence begins by closing a control valve 36 to stop reactant flow through two of the reaction stacks. Once reactant flow has been stopped, the predetermined amount of catalyst is withdrawn from the two reaction stacks from which reactant flow has been selectively stopped. For periodic catalyst replacement, a large volume of catalyst will typically be removed from each reaction stack. A volume of catalyst equal to about 25% of the total volume in the reaction stack is preferably removed. As the catalyst is withdrawn from the bottom of the reaction stack, replacement catalyst flows from catalyst vessel 16 to replace an amount of catalyst equal to that withdrawn. Following replacement of the catalyst, control valve 36 on outlet pipe 32 is opened to reestablish reactant flow through the reactant stack that has just received fresh catalyst. The sequence then continues with the closing of the outlet piping valve for the next pair of reaction stacks to stop flow therefrom. Once an equivalent volume of catalyst has again been exchanged in the next pair of reaction stacks, the sequence continues until an equivalent volume of catalyst has been exchanged in all of the reaction stacks.

Replacement of catalyst in this manner will not disrupt the process to any substantial degree. The complete flow of reactants through the reactor may be maintained while changing catalyst out in the selected reactant stacks with only a moderate increase in pressure drop. The full flow of reactants can normally be maintained through out the catalyst change out process. In most processes it is also not necessary to stop the flow of heat exchange fluid through the reactant stacks while reactant flow is restricted or stopped for catalyst change out. For most processes only a relatively small change in temperature of the heating medium occurs as it flows through the heat exchange channels. This temperature will usually be less than 20° F. As a result, no overheating of the reaction stacks is likely to occur during the catalyst change out process in spite of the restriction or removal of reactants. In most cases, reactant flow will be essentially stopped during the catalyst change out process. However, it may still be desirable to maintain a minimum amount of flow through the reaction zone to prevent a stagnant condition in the reaction space. The need to maintain some reactant flow or reduce the flow of heating medium during catalyst change out will depend on the particular process in which the invention is practiced.

Catalytic reforming is a well established hydrocarbon conversion process employed in the petroleum refining industry for improving the octane quality of hydrocarbon feedstocks, the primary product of reforming being motor gasoline. The art of catalytic reforming is well known and does not require extensive description herein. Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasoline comprised of relatively large concentrations of naphthenic and substantially straight chain paraffinic hydrocarbons, which are subject to aromatization through dehydrogenation and/or cyclization reactions. Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,119,526 (Peters et al.); U.S. Pat. No. 4,409,095 (Peters); and U.S. Pat. No. 4,440,626 (Winter et al.), the contents of which are herein incorporated by reference.

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta, and the theta alumina with gamma and eta alumina giving the best results. An important property related to the performance of the catalyst is the surface area of the carrier. Preferably, the carrier will have a surface area of from 100 to about 500 m$^2$/g. The particles are usually spheroidal and have a diameter of from about $\frac{1}{16}^{th}$ to about $\frac{1}{8}^{th}$ inch (1.5–3.1 mm), though they may be as large as $\frac{1}{4}^{th}$ inch (6.35 mm). A preferred catalyst particles diameter is $\frac{1}{16}^{th}$ inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reforming operation employs a moving bed reaction zone and regeneration zone. The present invention is applicable to such moving bed zones. In a moving bed operation, fresh catalyst particles are fed to a reaction zone by gravity. Catalyst is withdrawn from the bottom of the reaction zone and transported to a regeneration zone where a multi-step regeneration process is used to recondition the catalyst to restore its full reaction promoting ability. Catalyst flows by gravity through the various regeneration steps and then is withdrawn from the regeneration zone and furnished to the reaction zone. Catalytic reforming processes typically effect the repeated transfer of relatively small amounts of catalyst at closely spaced points in time. Therefore while the catalyst movement is often referred to as continuous, it is actually semi-continuous.

Catalytic dehydrogenation is another example of an endothermic process that advantageously uses the process and apparatus of this invention. Briefly, in catalytic dehydrogenation, a feedstock is admixed with a recycle stream comprising hydrogen and contacted with catalyst in a reaction zone. Feedstocks for catalytic dehydrogenation are typically petroleum fractions comprising paraffins having from about 3 to about 18 carbon atoms. Particular feedstocks will usually contain light or heavy paraffins. For example, a usual feedstock for producing heavy dehydrogenation products will comprise paraffins having 10 or more carbon atoms. The catalytic dehydrogenation process is particularly applicable to the treatment of hydrocarbon feedstocks containing substantially paraffinic hydrocarbons which are subject to dehydrogenation reactions to thereby form olefinic hydrocarbon compounds.

A catalytic dehydrogenation reaction is normally effected in the presence of catalyst particles comprised of one or more Group VIII noble metals (e.g., platinum, iridium, rhodium, palladium) combined with a porous carrier such as a refractory inorganic oxide. Alumina is again a commonly used carrier and the preferred alumina materials are again the same as those described for catalytic reforming. Generally the catalyst particles have a chloride concentration of between 0.5 and 3 wt-%. During the course of a dehydrogenation reaction, catalyst particles also become deactivated as a result of coke deposition and require regeneration similar to that described in conjunction with the reforming process; therefore, the dehydrogenation process will again employ the moving bed reaction zone of this invention.

Dehydrogenation conditions include a temperature of from about 400° to about 900° C. (752° to about 1652° F.), a pressure of from about 0.01 to 10 atmospheres and a liquid hourly space velocity (LHSV) of from about 0.1 to 100 $hr^{-1}$. Generally, for normal paraffins, the lower the molecular weight, the higher the temperature required for comparable conversions. The pressure in the dehydrogenation zone is maintained as low as practicable, consistent with equipment limitations, to maximize the chemical equilibrium advantages. The preferred dehydrogenation conditions of the process of this invention include a temperature of from about 400°–700° C. (752° to about 1652° F.), a pressure from about 0.1 to 5 atmospheres, and a liquid hourly space velocity of from about 0.1 to 100 $hr^{-1}$.

The effluent stream from the dehydrogenation zone generally will contain unconverted dehydrogenatable hydrocarbons, hydrogen, and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds.

The dehydrogenatable hydrocarbons may be admixed with a diluent gas before, while, or after being passed to the dehydrogenation zone. The diluent material may be hydrogen, steam, methane, carbons dioxide, nitrogen, argon and the like, or a mixture thereof. Hydrogen is the preferred diluent. Ordinarily, when a diluent gas is utilized as the diluent, it is utilized in amounts sufficient to ensure a diluent gas to hydrocarbon mole ratio of about 0.1 to about 20, with the best results being obtained when the mole ratio is about 0.5 to 10. The diluent hydrogen stream passed to the dehydrogenation zone will typically be recycled hydrogen separated from the effluent from the dehydrogenation zone in the hydrogen separation zone.

Water, or a material which decomposes at dehydrogenation conditions to form water, such as an alcohol, aldehyde, ether or ketone, may be added to the dehydrogenation zone. The water or water precursor may be added either continuously or intermittently in an amount to provide, calculated on the basis of equivalent water, about 1 to about 20,000 weight ppm of the hydrocarbon feed stream. Addition of about 1 to about 10,000 weight ppm of water gives best results when dehydrogenating paraffins having from 6 to 30 or more carbon atoms. Additional information related to the operation of dehydrogenation catalysts, operating conditions, and process arrangements can be found in U.S. Pat. Nos. 4,677,237; 4,880,764 and 5,087,792; the contents of which are hereby incorporated by reference.

EXAMPLE

The effect of using the process and reactor arrangement of this invention to change catalyst and maintain isokinetic conditions was investigated in a hydrocarbon conversion process for the dehydrogenation of paraffins. This simulation predicted the results of semi-continuously changing out catalyst in a dehydrogenation reaction zone by periodically replacing the catalyst in 10% increments. The catalyst is a typical dehydrogenation catalyst comprising a platinum on an alumina support. The activity of the catalyst varied linearly in a stepwise manner from 100% at the top of the bed to 55 % at the bottom of the bed. The process operated at a hydrogen to hydrocarbon ratio of 2.9 with an LHSV of 31.5. The reaction zone was maintained at an average pressure of about 13.5 psig. The feedstream at a flow rate of about 128,000 lbs/hr entered the reaction zone and had a molar composition as shown in the Table. The feedstream entered the reactor at an inlet temperature of about 810° F. and exited at an average outlet temperature of about 895° F. The feedstream was countercurrently contacted with 1.75 million lbs/hr of a heating medium having a density of 5.198 $lbs/ft^3$ and a heat capacity of 0.303 BTUs/lb/°F. The heating medium entered the process at a temperature of about 932° F. and exited at an average outlet temperature of about 898° F. Weight percent conversion of the feedstream was 20.15 wt-% with a wt-% selectivity of 85.7% monoolefins, 4.7% diolefins, 4% aromatics, and 4.2% light ends.

TABLE

| STREAM DESCRIPTION MOL-% | FEED |
|---|---|
| $H_2O$ | 1.78 |
| Hydrogen | 71.67 |
| Methane | 0.47 |
| Ethane | 0.92 |
| Propane | 0.20 |
| n-Butane | 0.06 |
| n-Pentane | 0.02 |
| n-Decane | 2.72 |
| $n-C_{11}$ | 10.85 |
| $n-C_{12}$ | 7.94 |
| $n-C_{13}$ | 3.22 |
| $n-C_{14}$ | 0.160 |
| 1-Nonene | 0.000 |
| 1-Decene | 0.000 |
| 1-Undecene | 0.000 |
| 1-Dodecene | 0.000 |
| 1-Tridecene | 0.000 |
| TOTAL: | 100.01 |

What is claimed is:

1. A channel reactor arrangement for contacting reactant with a particulate catalyst, indirectly heat exchanging the reactants with a heat transfer fluid and replacing catalyst particles on stream, said arrangement comprising:

a) a reactor vessel;

b) a plurality of reaction stacks located in said reactor vessel comprising a plurality of parallel plates extending vertically and horizontally and defining heat transfer channels and reactant channels in each reaction stack;

c) openings for passing a reactant stream through said reactant channels and a plurality of manifolds, each manifold in communication with reactant channels in less than all of the reaction stacks for collecting the fluid flow from the reactant channels, an outlet defined by each manifold and a valve for regulating the flow from each outlet independently of a valve on an outlet defined by another of said plurality of manifolds;

d) a catalyst distributor at the top of each reaction stack, a catalyst collector at the bottom of each reaction stack and each reaction stack including a dedicated valve for selectively controlling the addition and withdrawal of catalyst particles from each reaction stack; and e) means for passing a heat exchange fluid through the heat exchange channels of each reaction stack.

2. The arrangement of claim 1 wherein said heat exchange channels include inlets for passing heat exchange fluid into said heat exchange channels, said inlets being disposed proximate to the bottom of each reaction stack.

3. A reactor for contacting reactants with a particulate catalyst, indirectly heat exchanging the reactants with a heat transfer fluid and replacing catalyst particles on stream, said reactor comprising:

a) a reactor vessel;

b) a plurality of reaction stacks located in said reactor vessel, each reaction stack comprising a plurality of parallel plates extending vertically and horizontally and defining heat transfer channels and reactant channels in each reaction stack;

c) a reactant inlet defined by said reactor vessel for passing a reactant stream into said reactant channels;

d) at least two outlet manifolds with each outlet manifold in communication with a valve for independently regulating the flow of fluid from the reactant channels and each manifold in communication with less than the total number of reactant channels;

e) a catalyst distributor at the top of each reaction stack, a catalyst collector at the bottom of each reaction stack and each reaction stack including a dedicated valve for selectively controlling the addition and withdrawal of catalyst particles from each reaction stack; and f) means for passing a heat exchange fluid through the heat exchange channels in each reaction stack.

4. The arrangement of claim 3 wherein each outlet manifold communicates with two reaction stacks.

5. The arrangement of claim 4 wherein the reaction stacks comprise a plurality of corrugated plates that define the heat exchange channels and the reactant channels.

6. The arrangement of claim 3 wherein at least two inlet manifolds communicate said reactant inlet with different reaction stacks to supply reactants thereto and each outlet manifold communicates with reaction stacks that receive fluid flow from different inlet manifolds.

7. The reactor of claim 3 wherein said heat exchange channels comprise an inlet disposed proximate to the bottom of each reaction stack.

8. A reactor for contacting reactants with a particulate catalyst, indirectly heat exchanging the reactants with a heat transfer fluid and replacing catalyst particles on stream, said reactor comprising:

a) a plurality of reaction stacks, each reaction stack comprising a plurality of parallel plates extending vertically and horizontally and defining heat transfer channels and reactant channels in each reaction stack;

b) a plurality of reactant inlet manifolds each communicating with more than one reaction stack for passing a reactant stream into said reactant channels;

c) a plurality of outlet manifolds with each outlet manifold in communication with at least two reaction stacks;

d) a valve for independently regulating the flow of fluid into each inlet manifold or out of each outlet manifold;

e) a catalyst distributor at the top of each reaction stack, a catalyst collector at the bottom of each reaction stack and means for selectively controlling the addition and withdrawal of catalyst particles from each reaction stack without affecting catalyst particles in another reaction stack; and f) means for passing a heat exchange fluid through the heat exchange channels in each reaction stack.

9. The arrangement of claim 8 wherein each inlet and outlet manifold communicates with two reaction stacks.

10. The arrangement of claim 8 wherein the reaction stacks comprise a plurality of corrugated plates that define the heat exchange channels and the reactant channels.

11. The reactor of claim 8 wherein said heat exchange channels comprise inlets disposed proximate to the bottom of each reaction stack.

* * * * *

UNITED STATES PATENT AND TRADEMARK OFFICE
CERTIFICATE OF CORRECTION

PATENT NO. : 6,432,369 B1
DATED : August 13, 2002
INVENTOR(S) : Robert C. Mulvaney, III et al.

It is certified that error appears in the above-identified patent and that said Letters Patent is hereby corrected as shown below:

<u>Column 13,</u>
Line 23, replace "reactant" with -- reactants --.

Signed and Sealed this

Fourteenth Day of January, 2003

JAMES E. ROGAN
*Director of the United States Patent and Trademark Office*